United States Patent
Conley et al.

(10) Patent No.: US 11,736,428 B2
(45) Date of Patent: *Aug. 22, 2023

(54) ENRICHED MESSAGE EMBEDDING FOR CONVERSATION DEINTERLEAVING

(71) Applicant: International Business Machines Corporation, Armonk, NY (US)

(72) Inventors: Devin A. Conley, Austin, TX (US); Priscilla S. Moraes, Pflugerville, TX (US); Lakshminarayanan Krishnamurthy, Round Rock, TX (US); Oren Sar-Shalom, Nes Ziona (IL)

(73) Assignee: International Business Machines Corporation, Armonk, NY (US)

( * ) Notice: Subject to any disclaimer, the term of this patent is extended or adjusted under 35 U.S.C. 154(b) by 922 days.

This patent is subject to a terminal disclaimer.

(21) Appl. No.: 16/450,567

(22) Filed: Jun. 24, 2019

(65) Prior Publication Data

US 2020/0344193 A1 Oct. 29, 2020

Related U.S. Application Data

(63) Continuation of application No. 16/391,458, filed on Apr. 23, 2019, now Pat. No. 11,677,705.

(51) Int. Cl.
*H04L 51/216* (2022.01)
*G06N 3/044* (2023.01)
*G06N 3/08* (2023.01)

(52) U.S. Cl.
CPC .......... *H04L 51/216* (2022.05); *G06N 3/044* (2023.01); *G06N 3/08* (2013.01)

(58) Field of Classification Search
CPC ....... H04L 51/216; H04L 51/52; H04L 51/04; G06N 3/0445; G06N 3/08; G06N 3/0454
See application file for complete search history.

(56) References Cited

U.S. PATENT DOCUMENTS

| | | | |
|---|---|---|---|
| 6,212,548 B1 | 4/2001 | DeSimone et al. | |
| 9,338,114 B2 | 5/2016 | Affronti et al. | |
| 9,641,472 B2 | 5/2017 | Ross | |
| 9,705,832 B2 * | 7/2017 | Waltermann | H04L 51/216 |
| 2003/0114174 A1 | 6/2003 | Walsh et al. | |

(Continued)

OTHER PUBLICATIONS

Williams, J. D., Asadi, K., & Zweig, G. (2017). Hybrid code networks: practical and efficient end-to-end dialog control with supervised and reinforcement learning. arXiv preprint arXiv:1702.03274 (Year: 2017).*

(Continued)

*Primary Examiner* — Bhavesh M Mehta
*Assistant Examiner* — Nandini Subramani
(74) *Attorney, Agent, or Firm* — Van Leeuwen & Van Leeuwen; Jared C. Chaney (57) ABSTRACT

An approach is provided that receives a message and applies a deep analytic analysis to the message. The deep analytic analysis results in a set of enriched message embedding (EME) data that is passed to a trained neural network. Based on a set of scores received from the trained neural network, a conversation is identified from a number of available conversations to which the received message belongs. The received first message is then associated with the identified conversation.

5 Claims, 7 Drawing Sheets

(56) References Cited

U.S. PATENT DOCUMENTS

| | | | |
|---|---|---|---|
| 2007/0255791 A1 | 11/2007 | Bodlaender et al. | |
| 2013/0007137 A1 | 1/2013 | Azzam et al. | |
| 2013/0273976 A1* | 10/2013 | Rao | G06F 40/30 |
| | | | 455/563 |
| 2014/0245178 A1* | 8/2014 | Smith | H04L 51/216 |
| | | | 715/753 |
| 2015/0244657 A1* | 8/2015 | Ghafourifar | H04L 51/066 |
| | | | 709/206 |
| 2017/0060844 A1 | 3/2017 | He et al. | |
| 2019/0140997 A1* | 5/2019 | Lewin-Eytan | H04L 51/42 |
| 2019/0205743 A1* | 7/2019 | Jiang | G06N 3/045 |

OTHER PUBLICATIONS

Wang et al., "Context-based message expansion for disentanglement of interleaved text conversations," NAACL '09 Proceedings of Human Language Technologies: The 2009 Annual Conference of the North American Chapter of the Association for Computational Linguistics, Boulder, Colorado, Jun. 2009 (Year: 2009).*

Shen et al., "Thread detection in dynamic text message streams," SIGIR '06, Proceedings of the 29th annual international ACM SIGIR conference on Research and development in information retrieval, Aug. 2006, Seattle, Washington, pp. 35-42 (Year: 2006).*

Wang et al., "Context-based message expansion for disentanglement of interleaved text conversations," NAACL '09 Proceedings of Human Language Technologies, Jun. 2009, pp. 200-208 (in IDS) (Year: 2009).*

Shen et al., "Thread detection in dynamic text message streams," SIGIR '06, Proceedings of the 29th annual international ACM SIGIR conference on Research and development in information retrieval, Aug. 2006, Seattle, Washington, pp. 35-42 (IDS) (Year: 2006).*

Wang et al., "Context-based message expansion for disentanglement of interleaved text conversations," NAACL '09 Proceedings of Human Language Technologies: The 2009 Annual Conference of the North American Chapter of the Association for Computational Linguistics, Boulder, Colorado, Jun. 2009, pp. 200-208.

Heider et al., "Making semantic topicality robust through term abstraction," DEW '09 Proceedings of the Workshop on Semantic Evaluations: Recent Achievements and Future Directions, Boulder, Colorado, Jun. 2009, pp. 46-51.

Wang et al., "From user comments to on-line conversations," KDD '12 Proceedings of the 18th ACM SIGKDD International conference on Knowledge discovery and data mining, Beijing, China, Aug. 2012, pp. 244-252.

Backstrom et al., "Characterizing and curating conversation threads: expansion, focus, volume, re-entry," WSDM 13 Proceedings of the sixth ACM international conference on Web search and data mining, Rome, Italy, Feb. 2013, pp. 13-22.

Xu et al., "Cached Long Short-Term Memory Neural Networks for Document-Level Sentiment Classification," Proceedings of the 2016 Conference on Empirical Methods in Natural Language Processing, Austin, Texas, Jan. 2016, 10 pages.

Domeniconi et al. "Identifying Conversational Message Threads by Integrating Classification and Data Clustering," Data Management Technologies and Applications: 5th International Conference, DATA 2016, Colmar, France, Jul. 2016, Revised Selected Papers, pp. 25-46.

Palangi et al., "Deep Sentence Embedding Using Long Short-Term Memory Networks: Analysis and Application to Information Retrieval," IEEE/ACM Transactions on Audio, Speech and Language Processing (TASLP), vol. 24, Issue 4, Apr. 2016, 25 Pages.

Shen et al., "Thread detection in dynamic text message streams," SIGIR '06, Proceedings of the 29th annual International ACM SIGIR conference on Research and development in information retrieval, Aug. 2006, Seattle, Washington, pp. 35-42.

Wang et al. "Making conversational structure explicit: identification of initiation-response pairs within online discussions," HLT '10 Human Language Technologies: The 2010 Annual Conference of the North American Chapter of the Association for Computational Linguistics, Los Angeles, California, Jun. 2010, pp. 673-676.

Ramachandran et al., "Untangling Topic Threads in Chat-Based Communication: A Case Study," 2011 AAAI Workshop, Association for the Advancement of Artificial Intelligence, San Francisco, California, Aug. 2011, pp. 50-55.

Wang et al., "Recovering Implicit Thread Structure in Newsgroup Style Conversations," Proceedings of the Second International Conference on Weblogs and Social Media, ICWSM 2008, Seattle, Washington, Mar. 2008, 9 pages.

Bergstrom et al., "Conversation Clusters: Grouping Conversation Topics through Human-Computer Dialog," 2009 ACM Conference on Human Factors in Computing Systems (CHI), Boston, Massachusetts, Apr. 2009, 4 pages.

"List of IBM Patents or Patent Applications Treated as Related," Letter from Leslie A. Van Leeuwen, Jun. 24, 2019, 1 page.

Conley et al., "Enriched Message Embedding for Conversation Deinterleaving," U.S. Appl. No. 16/391,458, filed Apr. 23, 2019, 41 pages.

* cited by examiner

ENRICHED MESSAGE EMBEDDING FOR CONVERSATION DEINTERLEAVING

BACKGROUND

The de-interleaving of different threads or messages within a group chat conversation is an unsolved challenge in natural language processing (NLP). While intuitive to a human, this is not yet a trivial task for computer system and is not provided by traditional processes that ingest textual data. De-interleaving of conversations requires a deep understanding of domain knowledge, semantics, and social dynamics. While some techniques have been developed and addressed at some of these areas, a holistic solution that leverages domain knowledge, semantics, and social dynamics for the purpose of conversation de-interleaving is not provided by traditional systems.

SUMMARY

An approach is provided that receives a message and applies a deep analytic analysis to the message. The deep analytic analysis results in a set of enriched message embedding (EME) data that is passed to a trained neural network. Based on a set of scores received from the trained neural network, a conversation is identified from a number of available conversations to which the received message belongs. The received first message is then associated with the identified conversation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-7 describe an approach that defines an enriched message embedding that can be used in conjunction with a long short-term memory (LSTM) recurrent neural network (RNN) binary classifier for thread de-interleaving. The embedding is formed by combining topic information, semantic information, and auxiliary information around social dynamics. This embedding is passed through an LSTM RNN for binary "in-context" classification. The approach classifies whether the message is part of the conversation, given the previous messages that have already been passed through the system. The de-interleaving of conversations enables the usage of many existing NLP techniques within the context of group conversation and allows for better ingestion of human conversations into question-answering (QA) systems.

During de-interleaving, the message is either added to the thread that resulted in the highest "in-context" classification, or used as the first message in a new thread. When compared to using latent Dirichlet allocation (LDA), the approach described herein is more online, less dependence on an up-to-date topic model and better handles important messages that would be otherwise be filtered as stop words.

The enriched embedding is formed by concatenating feature vectors extracted based on topic, semantics, and social dynamics. The topic embedding of the sentence is included in order to capture information around message topic, content, and vocabulary. This is based off of a "bag of words" approach and reflects the actual words themselves rather than the intent or type of the sentence. This could be formed in various ways. For example, one technique shown in Deep Sentence Embedding using LSTM trains a LSTM RNN for document retrieval. This means that the deep embedding extracted from the LSTM layer is heavily representative of the sentence topic. Given an LDA model, another option could be simply using the joint probability of the entire sentence over each topic.

The semantic embedding of the sentence is included in order to capture information about the type of message or the intent of sender. For the purposes of de-interleaving, the approach considers whether the message was a question, a statement, positive feedback, negative feedback. etc. The approach further classifies whether the message follows the structure of the typical first message in a conversation. Further, the approach operates on cases where the message might belong to multiple classes. This type of information is useful, specifically in a chat environment where messages are very short and concise and may not even contain non stop-words.

This vector could be formulated by simply taking the confidence scores associated with classifying each type of message through a support vector machine (SVM) or convolutional neural network (CNN). In another embodiment, the approach train an LSTM RNN for sentence classification, then takes the LSTM layer as the vector. In some environments, this embodiment might provide a more rich embedding.

The third vector is included to enrich our overall embedding with auxiliary information. This includes binary values corresponding to whether the user has already participated in this thread, whether the user was mentioned previously, etc. It also includes float values for social score and topic score.

The training of the "In-Context" binary classifier uses two-person conversations as an implicit ground truth for training the secondary LSTM. The approach assumes that the dynamics of the chat interaction between individuals in a group and in a direct message are sufficiently similar to be useful in training. To generate positive examples, the approach treats every message as a binary classification problem, given the previous messages in that same conversation as evidence. More specifically, the approach passes each prior message through the LSTM, and expects a classification of 1.0 for the message of interest. To generate negative examples. the approach again takes the previous messages of a conversation as evidence, but this time the approach randomly samples the next message from another conversation in the dataset. In this case, a classification of 0.0 is expected for the message of interest, given that the context is of a different conversation. In one embodiment, training occurs in phases of increasing sample length, introducing longer samples to the dataset gradually.

Once the model has been trained, the trained model is used to de-interleave messages. For each ongoing conversation being tracked within a given channel, the approach caches the state of the LSTM cells as a representation of the context of that thread. When evaluating messages as "in-context" for a specific conversation, the approach loads the values of that cached LSTM layer into the neural network and evaluates it. The highest score from the LSTM is considered the correct thread for the message, and the new message is sorted appropriately. If the message is not classified as sufficiently "in-context" for any existing threads, a new thread is started. Ongoing threads expire, or end, after a certain number of messages or a certain amount of time has elapsed.

At a broad level, the approach described herein provides a deep message embedding of a sentence using deep learning technique to understand the underlying topics and sentence semantics for the purposes of de-interleaving. The approach further de-interleaves a dynamic number of threads in real-time. No learning overhead is required to accommodate a change to the number of conversations in a channel. The approach manages multiple concurrent sequences by caching the memory state in neural networks. This approach then allows the neural network to maintain the context of each sequence, while minimizing computational overhead.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
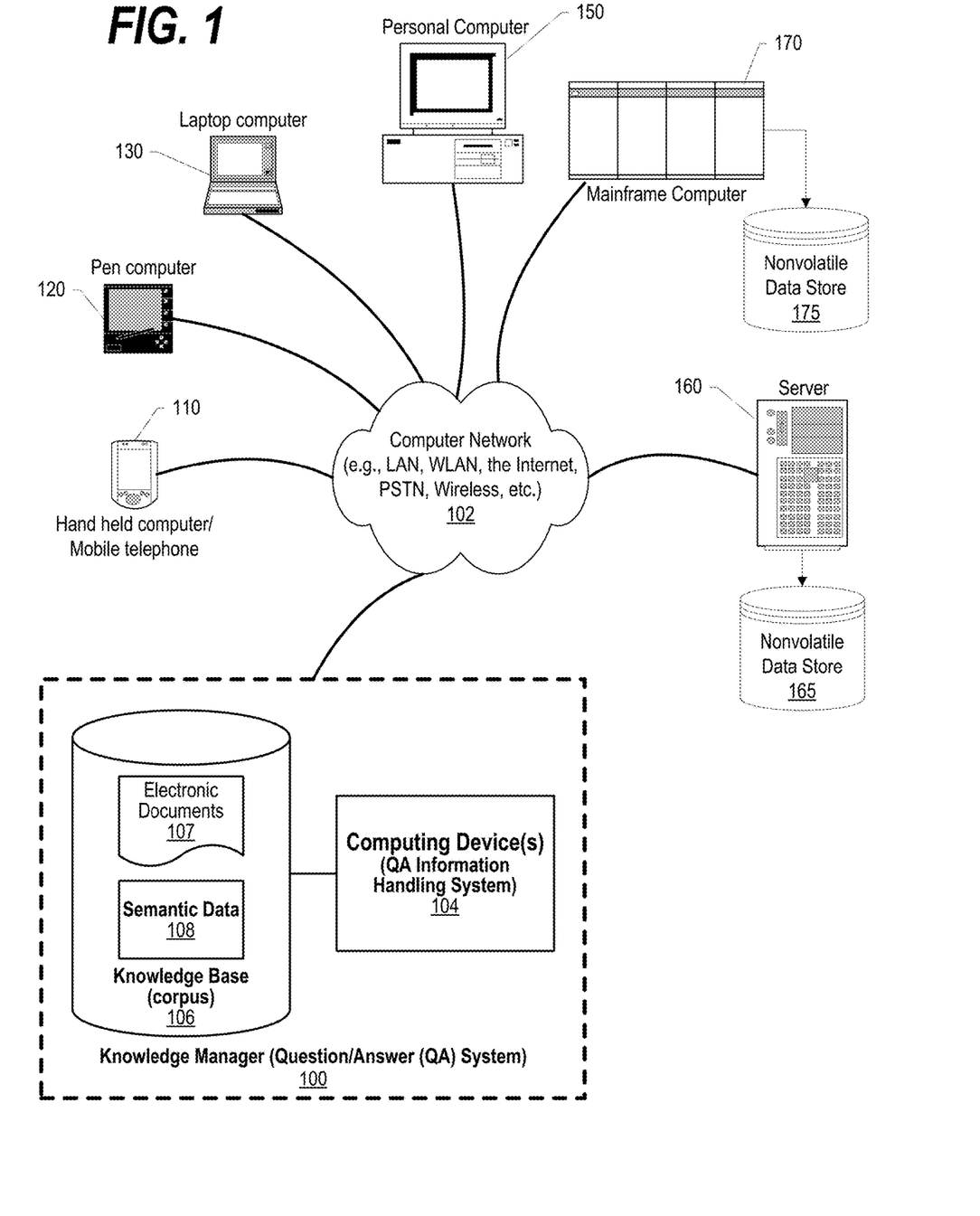
FIG. 1 depicts a network environment that includes a knowledge manager that utilizes a knowledge base.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
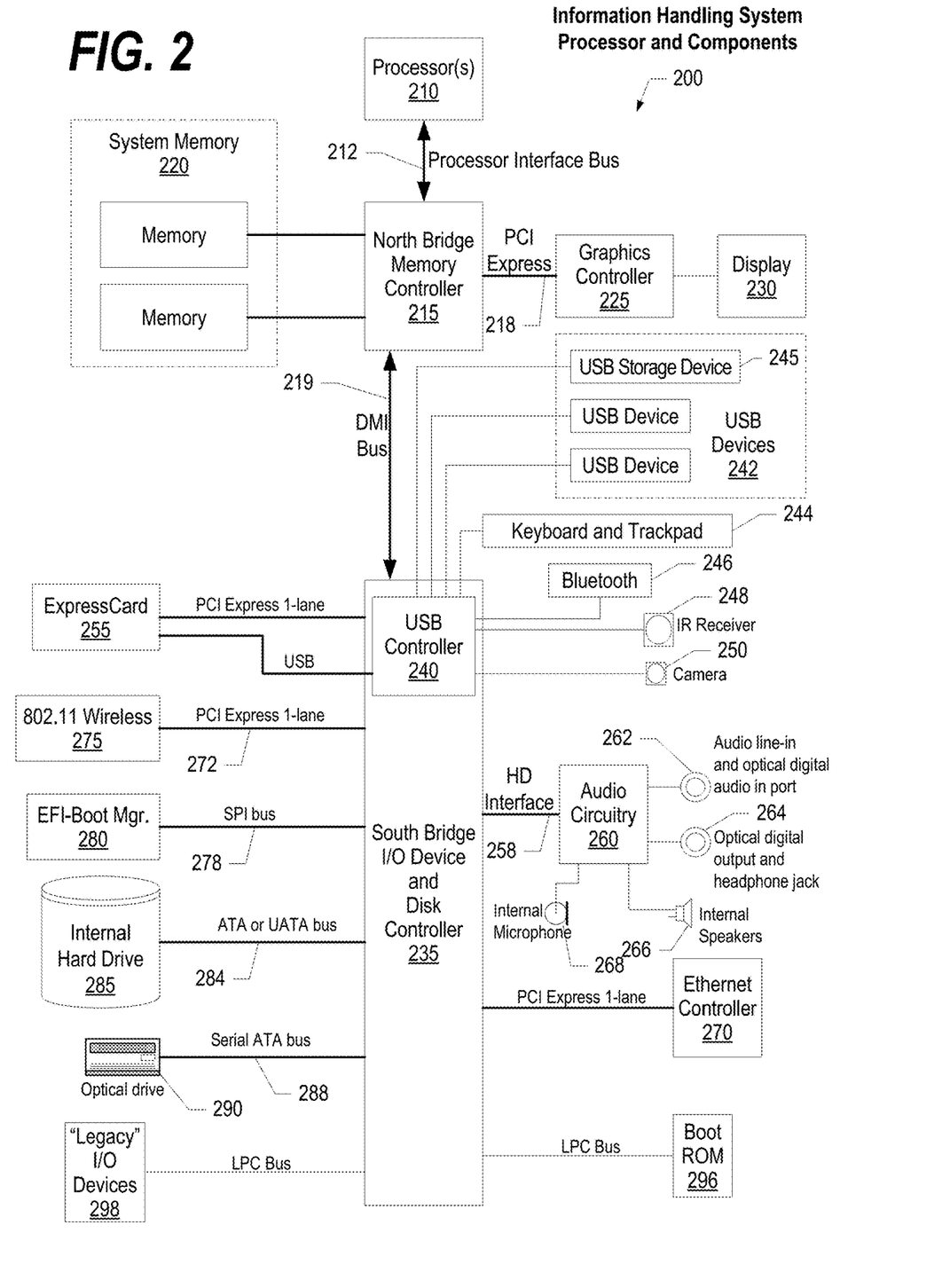
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
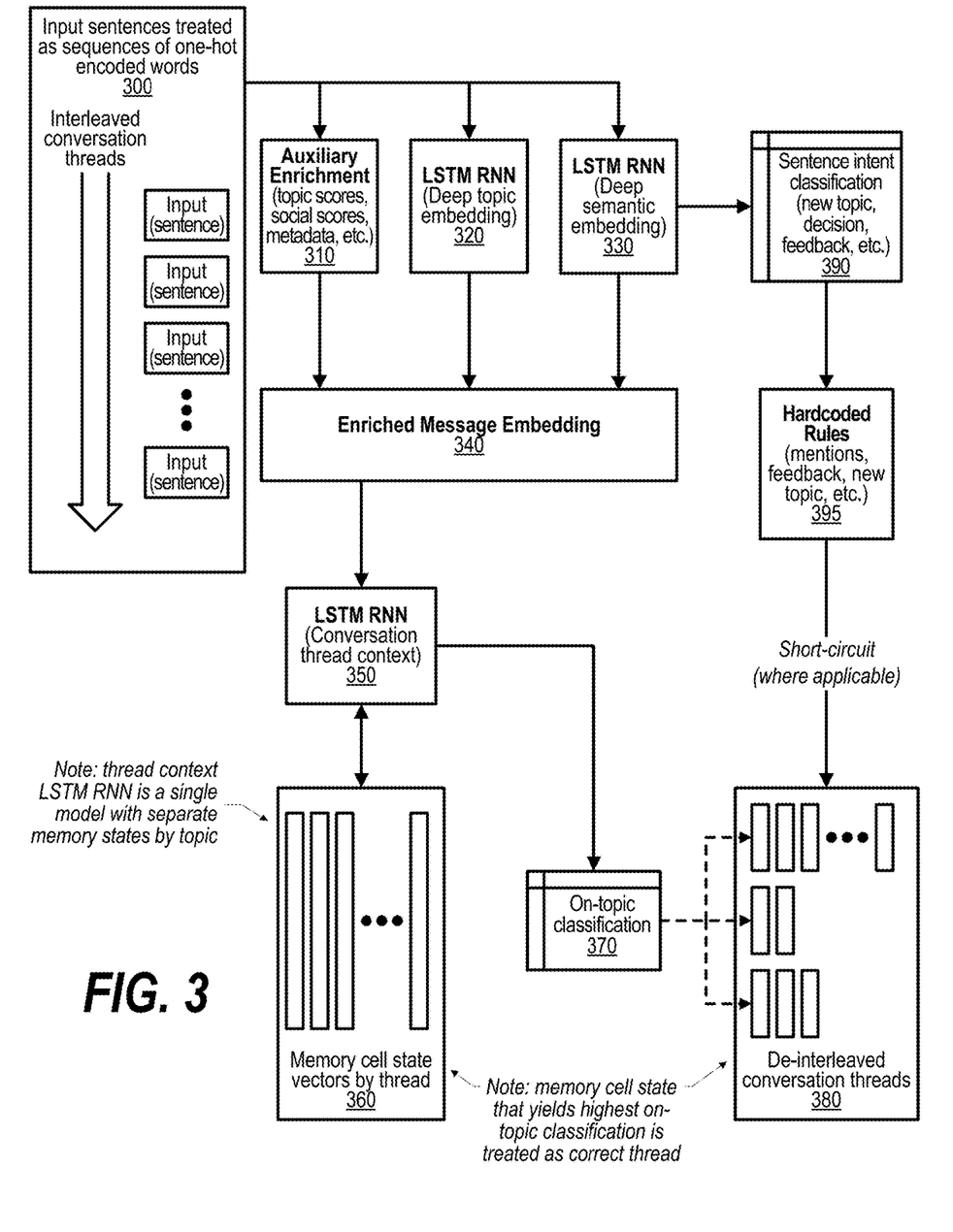
FIG. 3 is a component diagram that shows the various components included in an architecture that provides enriched message embedding by de-interleaving conversation threads.

FIG. 3 is a component diagram that shows the various components included in an architecture that provides enriched message embedding. Inputs 300 are messages, such as text messages, posts, chats, tweets, and the like. As shown, input messages are sentences that are treated as sequences of one-hot encoded words.

Enriched message embedding process 340 includes various processes that are used together to create combined vectors that are in a form that can be input to neural network 350. In one embodiment, the neural network is a long short term memory (LSTM) recurrent neural network (RNN). The enriched message embedding process uses auxiliary enrichment process 310 that analyzes the message's topic scores, social scores, and metadata scores to form a vector, topic embedding process 320 that analyzes the topic of the message (in one embodiment using an LSTM RNN to perform the analysis), and deep semantic embedding process 330 (also, in one embodiment using an LSTM RNN to perform the analysis).

Sentence intent classification data 390 includes data regarding new topics, decision, feedback, and the like. This data is processed by hard coded rules 395 to provide a short-circuit to de-interleaved conversation threads 380, where appropriate.

Neural network 350 is loaded with memory cell state vectors corresponding to each conversation thread. The message is input to the neural network by way of the enriched message embedding (EME) data that was created based on the message data. A score is output from the neural network indicating the message's affinity with each of the conversations. The best score from the set of conversations is compared to a threshold to determine if the message belongs to the conversation that corresponds to the best score as represented by on-topic classification 370. If the high score meets or exceeds the threshold, the message is deemed to belong to the corresponding conversation and the message data and the message metadata (memory cell state vectors of the neural network and the best score) are stored in memory area 380 which is a de-interleaved set of conversation threads with each message being included in one of the conversations.

Returning to the comparison of the best score and the threshold, if the best score does not reach the threshold (indicating that the message does not belong to any of the current conversations), then a new conversation thread is initialized and the message text and the metadata for the initialized conversation thread is stored in a new de-interleaved conversation thread 380.

Figure 4:
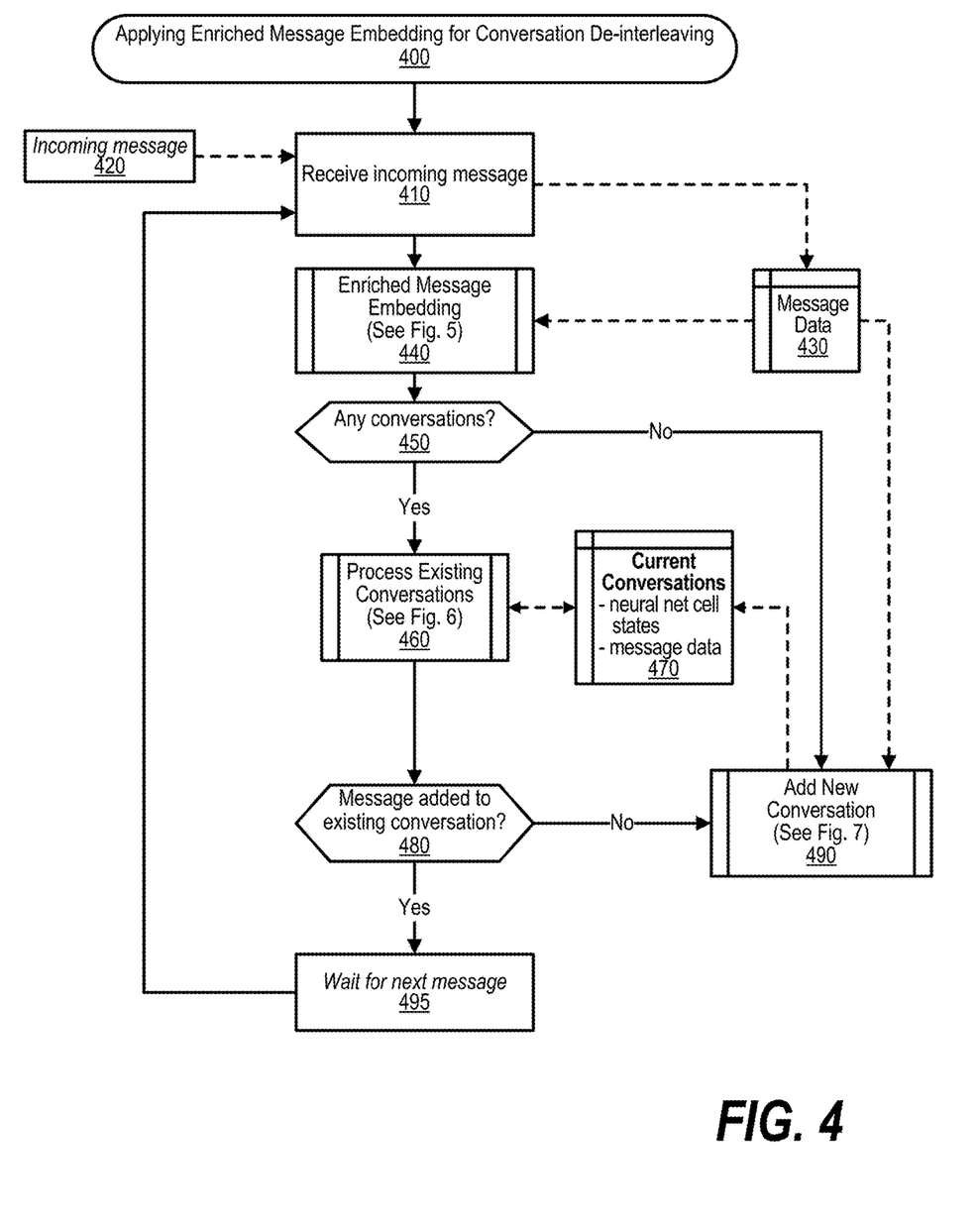
FIG. 4 is a depiction of a flowchart showing the logic used to apply enriched message embedding for conversation de-interleaving.

FIG. 4 is a depiction of a flowchart showing the logic used to apply enriched message embedding for conversation de-interleaving. FIG. 4 processing commences at 400 and shows the steps taken by a process that applies a deep analytic analysis to a received message for conversation de-interleaving. At step 410, the process receives incoming message 420. The message data is stored in memory area 430. At predefined process 440, the process performs the Enriched Message Embedding routine (see FIG. 5 and corresponding text for processing details).

The process determines as to whether there are already conversations that have been established (decision 450). If there are already conversations that have been established, then decision 450 branches to the 'yes' branch whereupon, at predefined process 460, the process performs the Process Existing Conversations routine (see FIG. 6 and corresponding text for processing details). On the other hand, if no conversations have been established (the message being the first message of the first conversation), then decision 450 branches to the 'no' branch whereupon, at predefined process 490, the process performs the Add New Conversation routine (see FIG. 7 and corresponding text for processing details).

Note that both predefined processes 460 and 470 update the current conversations data that is maintained in data store 470. At step 495, the process waits for next message. When the next message arrives, processing loops back to step 410 to process the message as described above.

Figure 5:
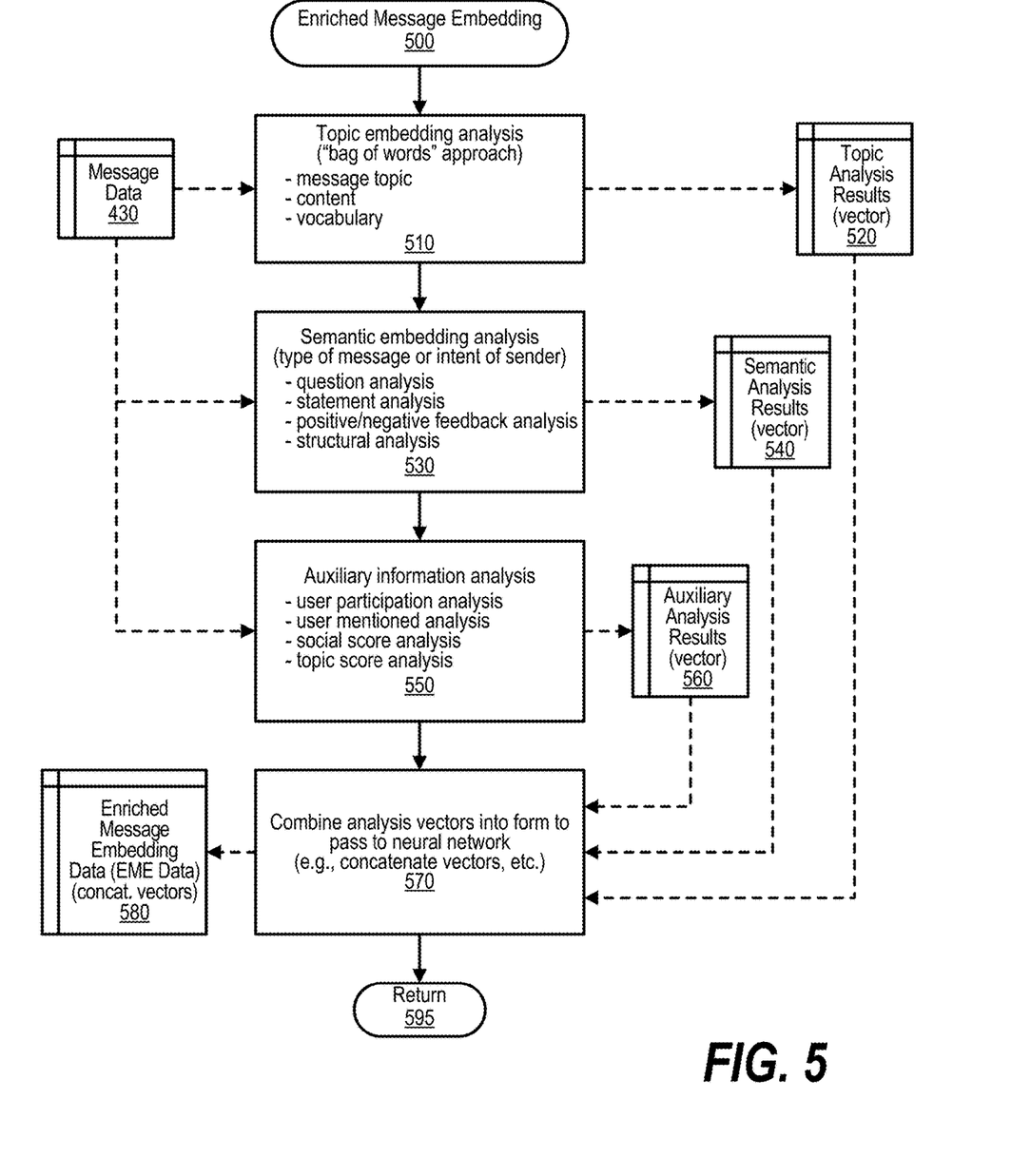
FIG. 5 is a depiction of a flowchart showing the logic used to perform enriched message embedding.

FIG. 5 is a depiction of a flowchart showing the logic used to perform enriched message embedding. FIG. 5 processing commences at 500 and shows the steps taken by a process that performs deep analytic analysis on the message to form a set of enriched message embedding (EME) data that is stored in memory area 580.

At step 510, the process performs a topic embedding analysis (e.g., a "bag of words" approach analysis, etc.) on message data 430. The topic embedding analysis analyzes a message topic of the message, a content of the message, and a vocabulary of the message. The result of step 510 is a topic analysis result which is a vector that is stored in memory area 520.

At step 530, the process performs a semantic embedding analysis on message data 430. This analysis is on the type of message or intent of sender and includes identifying if the message is a question, a statement, includes positive/negative feedback, as well as a structural analysis of the message. The result of step 530 is a semantic analysis which is a vector that is stored in memory area 540.

At step 550, the process performs a auxiliary information analysis on message data 430. The auxiliary information analysis includes a user participation analysis, a user being mentioned in the message analysis, a social score analysis, and a topic score analysis. The result of step 550 is an auxiliary analysis result which is a vector that is stored in memory area 560.

At step 570, the process combines each of the three analysis vectors (topic analysis vector, semantic analysis vector, and auxiliary analysis vector) into a form that is suitable to pass to the neural network. In one embodiment, step 570 combines the vectors by concatenating the vectors. The combined result of step 570 is then stored in memory area 580 as the enriched message embedding (EME) data that will be input to the neural network. FIG. 5 processing thereafter returns to the calling routine (see FIG. 4) at 595.

Figure 6:
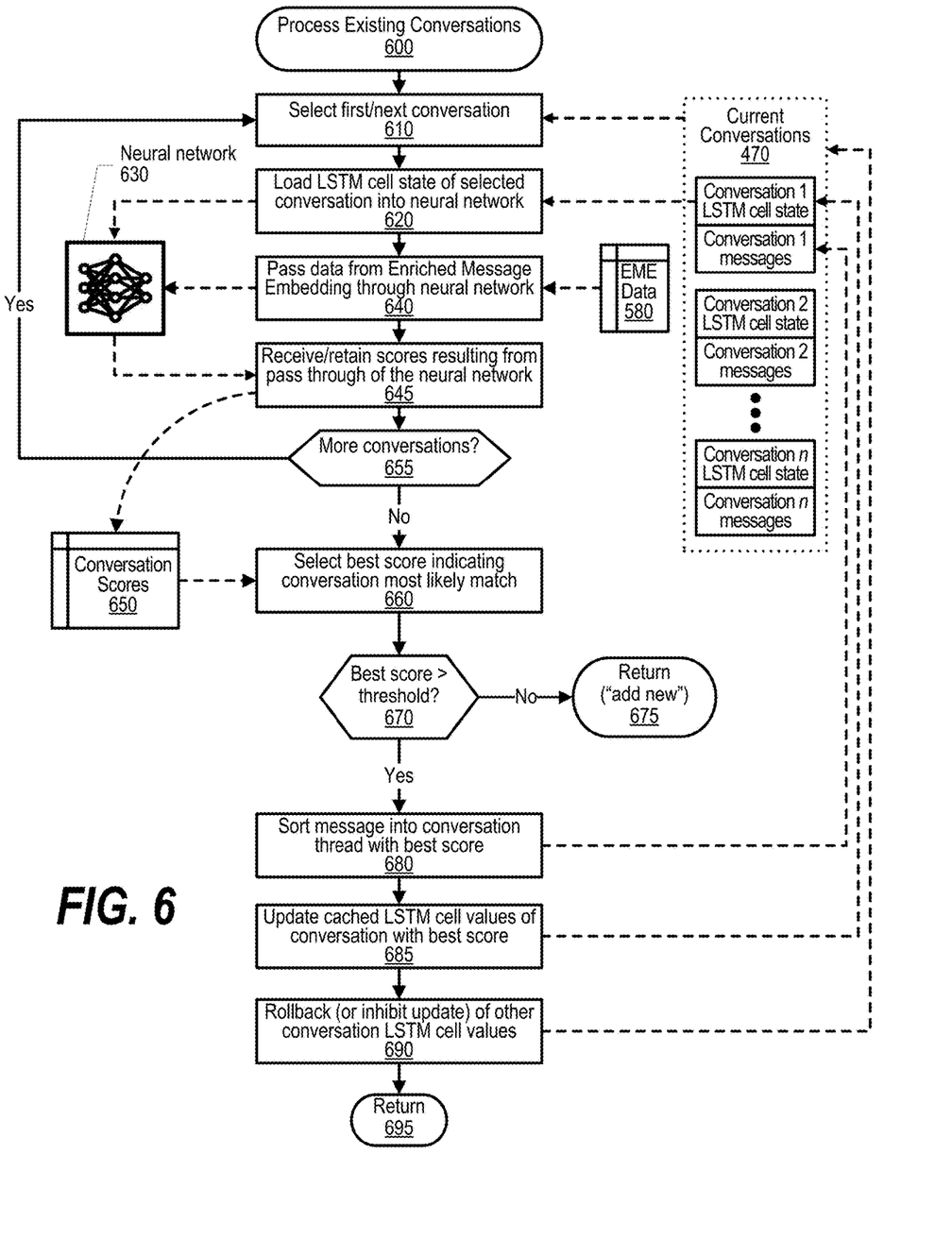
FIG. 6 is a depiction of a flowchart showing the logic used to extract de-interleaved data from existing conversation threads.

FIG. 6 is a depiction of a flowchart showing the logic used to extract de-interleaved data from existing conversation threads. FIG. 6 processing commences at 600 and shows the steps taken by a process that processes the incoming message against all of the existing conversations to see if the message belongs to one of these conversations. At step 610, the process selects the first conversation from current conversations memory area 470. Note that each conversation includes both the conversational message text data for the conversation as well as metadata that is neural network cell state information from when the conversation last had a a new message added to the conversation. In addition the scoring information resulting (output) from the neural network for the conversation can also be kept as metadata for the conversation.

At step 620, the process loads the neural network cell state using the selected conversation's stored cell state into neural network 630. At step 640, the process passes the EME data retrieved from memory area 580 through neural network 630. At step 645, the process receives and retains the scores resulting from having the data pass through the neural network with the scores being retained (stored) in memory area 650. The process determines as to whether there are more conversations to load into the neural network and then pass the EME data as discussed above (decision 655). If there are more conversations to load, then decision 655 branches to the 'yes' branch which loops back to step 610 to select and load the next conversation data into the neural network before passing the EME data through the neural network to receive the score data from the neural network. This looping continues until all of the conversations have been processed, at which point decision 655 branches to the 'no' branch exiting the loop.

At step 660, the process selects the best score from the conversation scores that were stored in memory area 650 with the best score corresponding to the conversation that is the most likely match with the incoming message. The process determines whether the best score meets or exceeds a threshold (decision 670). If the best score does not meet or exceed the threshold, then decision 670 branches to the 'no' branch whereupon processing returns to the calling routine (see FIG. 4) with a return code indicating that the incoming message does not belong to any existing conversations and, instead, is the start of a new conversation with the new conversation being initialized with the incoming message data.

Returning to decision 670, if the best score meets or exceeds the threshold, then decision 670 branches to the 'yes' branch whereupon steps 680 through 690 are performed to include the incoming message in the conversation that had the best score. At step 680, the process sorts the message into the conversation thread in which it belongs (the conversation corresponding to the best score) with the message text being stored in memory area 470 of de-interleaved messages. At step 685, the process updates the cached neural network cell values of the conversation with best score so that this set of cell values can be loaded the next time this conversation is loaded into the neural network. At step 690, the process rollbacks, or inhibits the update, of the other conversations neural network cell values so that the set of cell values for other conversations remains the same as they were before this iteration of the routine shown in FIG. 6 was performed. FIG. 6 processing thereafter returns to the calling routine (see FIG. 4) at 695.

Figure 7:
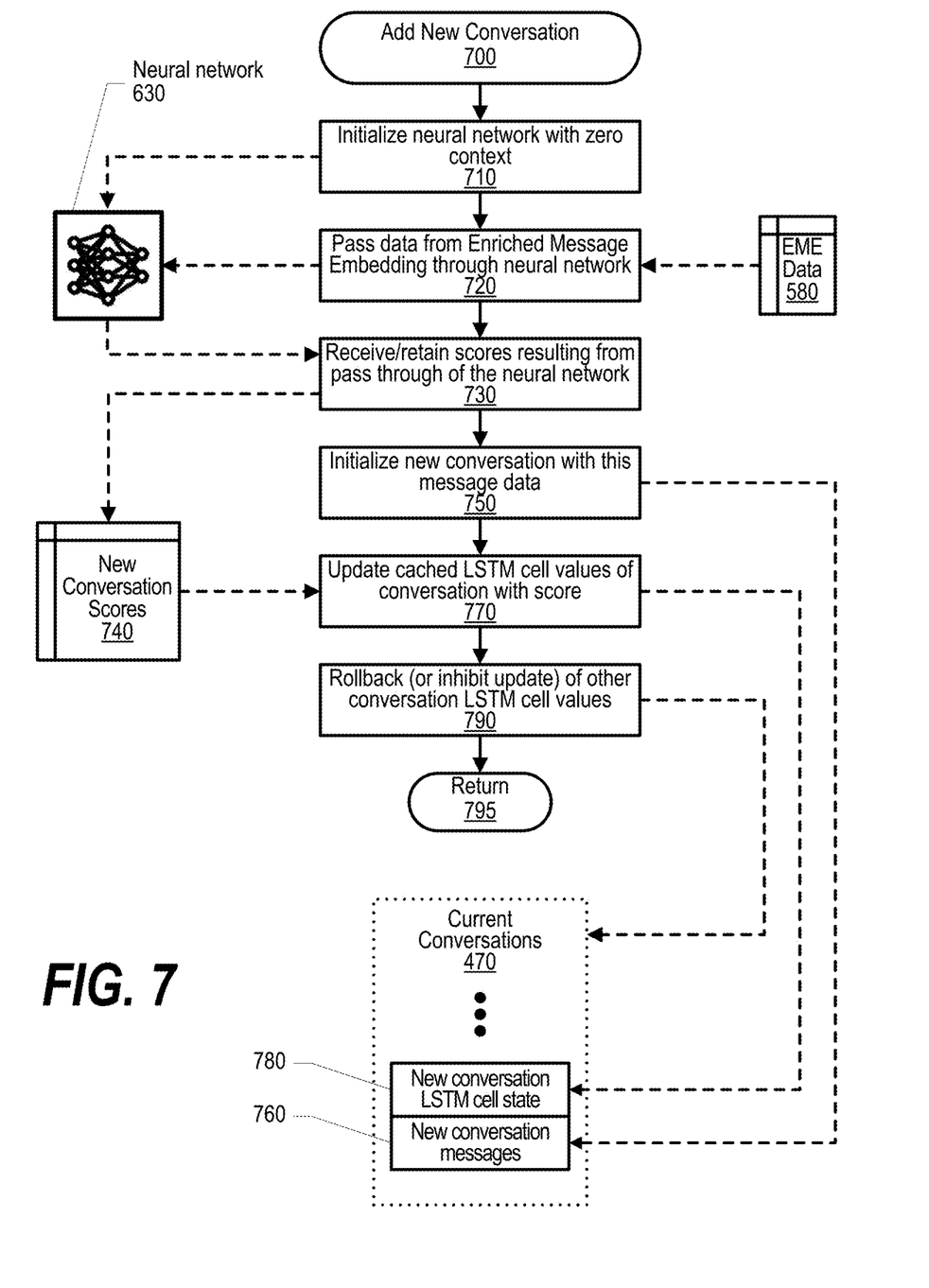
FIG. 7 is a depiction of a flowchart showing the logic used to extract de-interleaved data from new conversation threads.

FIG. 7 is a depiction of a flowchart showing the logic used to extract de-interleaved data from new conversation threads. FIG. 7 processing commences at 700 and shows the steps taken by a process that adds a new conversation to the set of current conversations that is maintained in memory area 470.

At step 710, the process initializes neural network 630 with zero context (without context of any current conversations). At step 720, the process passes EME data 580 through neural network 630 that has been initialized with zero context. At step 730, the process receives and retains scores resulting from the pass through of the neural network with the scores being retained in memory area 740.

At step 750, the process initializes a new conversation with this message data in memory area 470. New message data 760 includes the message text that was included in the incoming message.

At step 770, the process updates the metadata of the conversation with the set of neural network cell contents and, in one embodiment, with the score that resulted from passing the data through the neural network. This set of metadata is retained in memory area 780 so that the context of this conversation can be loaded into the neural network the next time the conversations are being processed by the steps shown in FIG. 6 to determine if an incoming message belongs in the conversation. At step 790, the process rollbacks, or inhibits the update, of any other conversation neural network cell values that are stored in memory area 470. FIG. 7 processing thereafter returns to the calling routine (see FIG. 4) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a first message and a second message;
   applying a deep analytic analysis to the received messages to form a first set and a second set of enriched message embedding (EME) data;
   processing each conversation included in a plurality of conversations, wherein, when selected, each of the conversations is processed by a trained neural network by:
      loading a set of cell states in the neural network with a set of previously saved cell states that correspond to the selected conversation;
      passing the first and second sets of EME data to the trained neural network;
      receiving a first set of scores from the trained neural network that indicates an affinity of the selected conversation to the received first message and a second set of scores from the trained neural network that indicates an affinity of the selected conversation to the received second message;
   identifying, based on comparing a threshold to the first and second sets of scores, one of the conversations to which the received first message belongs;
   associating the received first message with the identified conversation;
   comparing a best score from the second set of one or more scores to the threshold, wherein the determination that the second message belongs to any of the plurality of conversations is based on the best score failing to reach the threshold;
   creating a new conversation that is added to the plurality of conversations upon determination that the second message does not belong to any of the plurality of conversations; and
   associating the received second message with the new conversation.

2. The method of claim 1 further comprising:
processing each of the conversations included in the plurality of conversations, wherein, when selected, each of the conversations is processed by the neural network by:
  loading a set of cell states in the neural network with a set of previously saved cell states that correspond to the selected one of the conversations;
  passing the EME data through the neural network after the loading of the set of cell states; and
  receiving a score that indicates an affinity of the selected conversation to the received first message, wherein the score is one of the first set of one or more scores, wherein each of the first set of one or more scores is associated with one of the conversations; and
selecting a best score from the first set of one or more scores, wherein the conversation associated with the best score is identified as the conversation to which the first message belongs.

3. The method of claim 1 further comprising:
initializing the neural network with zero context;
passing the second set of EME data through the initialized neural network, resulting in a new set of cell states being stored in the neural network and output of a new score;
initializing the new conversation messages with the received message; and
initializing a set of new conversation cell states with the new set of cell states, wherein the new conversation messages and the set of new conversation cell states are included in the new conversation.

4. The method of claim 1 wherein the deep analytic analysis further comprises:
  performing a topic embedding analysis on the received message, wherein the topic embedding analysis identifies a topic of the received message, a content of the received message, and a vocabulary of the received message;
  performing a semantic embedding analysis on the received message, wherein the semantic embedding analysis includes a question analysis, a statement analysis, a positive/negative feedback analysis, and a structural analysis; and
  performing an auxiliary information analysis on the received message, wherein the auxiliary information analysis includes a user participation analysis, a user mentioned analysis, a social score analysis, and a topic score analysis.

5. The method of claim 4, further comprising: generating a first vector from the topic embedding analysis, a second vector from the semantic embedding analysis, and a third vector from the auxiliary information analysis; and combining the first, second, and third vectors to a form that is suitable as input to the neural network.

* * * * *